No. 780,712. PATENTED JAN. 24, 1905.
H. DRISKEL.
WEIGHING ATTACHMENT FOR HAY PRESSES.
APPLICATION FILED NOV. 9, 1904.
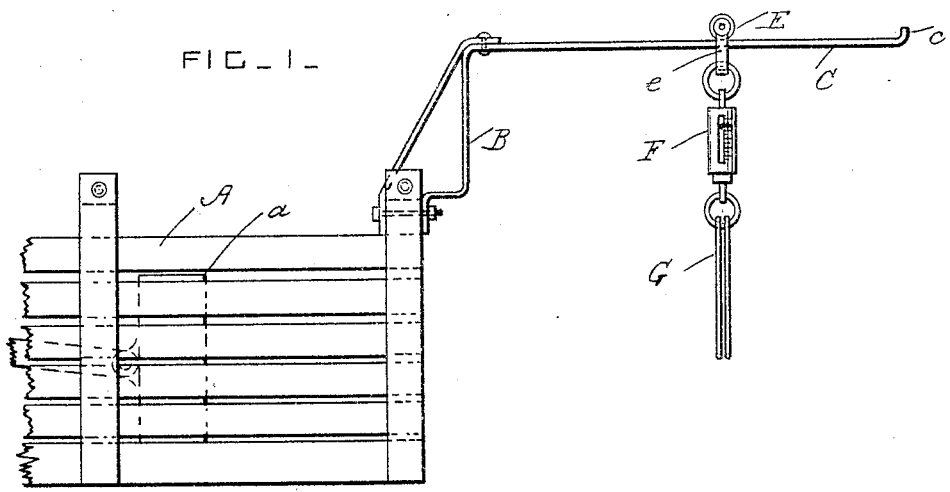
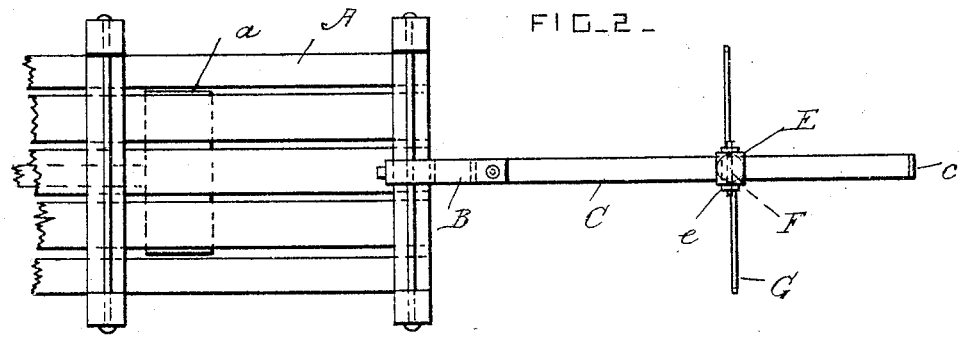
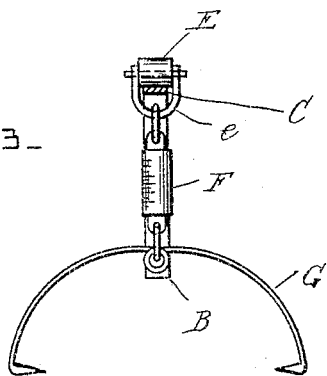
WITNESSES:
INVENTOR
Hugh Driskel
BY
Attorney No. 780,712. Patented January 24, 1905.

UNITED STATES PATENT OFFICE.

HUGH DRISKEL, OF LORETTO, PENNSYLVANIA.

WEIGHING ATTACHMENT FOR HAY-PRESSES.

SPECIFICATION forming part of Letters Patent No. 780,712, dated January 24, 1905.

Application filed November 9, 1904. Serial No. 232,027.

*To all whom it may concern:*

Be it known that I, HUGH DRISKEL, a citizen of the United States, residing at Loretto, in the county of Cambria and State of Pennsylvania, have invented certain new and useful Improvements in Weighing Attachments for Hay-Presses; and I do hereby declare the following to be a full, clear, and exact description of the invention, such as will enable others skilled in the art to which it appertains to make and use the same.

This invention relates to devices for weighing bales of hay when being discharged from a hay-press; and it consists in the novel construction and combination of the parts hereinafter fully described and claimed.

In the drawings, Figure 1 is a side view of the rear end portion of a hay-press provided with a weighing attachment according to this invention. Fig. 2 is a plan view of the same. Fig. 3 is an end view of the weighing attachment.

A is the rear end portion of a hay-press of any approved construction, and $a$ is the plunger which works in the press-chamber and presses the hay into bales. These bales are tied in the rear end portion of the press in any approved manner and are then discharged from the press.

B is a bracket secured to the middle part of the top of the rear end portion of the hay-press, and C is a horizontal track which projects rearwardly from the top of the said bracket and which is provided with a stop $c$ at its rear end. E is a roller which runs on the said track, and $e$ is a shackle pivoted to the end of the spindle of the said roller. F is a spring weighing-balance of any approved construction which is suspended from the said shackle, and G is a pair of tongs suspended from the said spring-balance and arranged to straddle the bale of hay at the rear part of the hay-press. The bale is engaged by the tongs before it leaves the press, and the roller runs along the track, so that the bale is caught by the tongs and is weighed by the spring-balance when it is discharged from the press.

What I claim is—

1. The combination, with a hay-press, of a horizontal track which projects from the rear end portion of the said hay-press, a carriage movable on the said track longitudinally of the said press, a spring-balance suspended from the said carriage, and a pair of tongs for engaging the bale suspended from the said spring-balance.

2. The combination, with a hay-press, of a bracket secured to the middle part of the top of the rear end portion of the hay-press, a single track-rail projecting rearwardly from the said bracket, a carriage which runs on the said track-rail, a spring-balance suspended from the said carriage, and a pair of tongs for engaging the bale suspended from the said spring-balance.

In testimony whereof I have affixed my signature in the presence of two witnesses.

HUGH DRISKEL.

Witnesses:
B. W. LITZINGER,
W. A. B. LITTLE.